United States Patent
Wen et al.

(10) Patent No.: US 9,696,339 B2
(45) Date of Patent: Jul. 4, 2017

(54) THREE-AXIS ACCELEROMETER (71) Applicant: SAGATEK CO., LTD., Taipei (TW)

(72) Inventors: Kuei-Ann Wen, Hsinchu (TW); Tai-Wei Chiang, New Taipei (TW)

(73) Assignee: SAGATEK CO., LTD., Taipei (TW)

( * ) Notice: Subject to any disclaimer, the term of this patent is extended or adjusted under 35 U.S.C. 154(b) by 293 days.

(21) Appl. No.: 14/724,417

(22) Filed: May 28, 2015

(65) Prior Publication Data
US 2016/0084873 A1    Mar. 24, 2016

(30) Foreign Application Priority Data

Sep. 18, 2014 (TW) .............................. 103132221 A (51) Int. Cl.
*G01P 15/125* (2006.01)
*G01P 15/18* (2013.01)

(52) U.S. Cl.
CPC ............ *G01P 15/125* (2013.01); *G01P 15/18* (2013.01)

(58) Field of Classification Search
CPC ............................... G01P 15/125; G01P 15/18
See application file for complete search history.

(56) References Cited

U.S. PATENT DOCUMENTS

| | | | |
|---|---|---|---|
| 7,757,555 B2 | 7/2010 | Pan et al. | |
| 8,413,511 B2 | 4/2013 | Ge et al. | |
| 8,459,114 B2 | 6/2013 | Hsu et al. | |
| 8,459,115 B2 * | 6/2013 | Wang | G01P 15/125 73/510 |
| 2002/0180462 A1 * | 12/2002 | Hartwell | G01P 15/125 324/662 |
| 2003/0106372 A1 * | 6/2003 | Adams | G01P 15/0802 73/514.32 |
| 2004/0172167 A1 * | 9/2004 | Pasolini | G01P 13/00 700/245 |
| 2004/0231420 A1 * | 11/2004 | Xie | B81B 3/0062 73/514.32 |
| 2008/0150554 A1 * | 6/2008 | Wang | G01C 19/5755 324/686 |

(Continued)

FOREIGN PATENT DOCUMENTS

| | | |
|---|---|---|
| CN | 101133332 A1 | 2/2008 |
| WO | WO 2012/172528 A1 | 12/2012 |

*Primary Examiner* — David Bolduc
(74) *Attorney, Agent, or Firm* — Muncy, Geissler, Olds & Lowe, P.C.

(57) ABSTRACT

A three-axis accelerometer to provide measurement of acceleration in three axes, comprising a substrate, a suspending mass block suspended in the substrate, a group of Y direction displacement sensors, a group of Z direction displacement sensors and a group of X direction displacement sensors; wherein the Y direction displacement sensors, the Z direction displacement sensors and the X direction displacement sensors are respectively arranged adjacent to the mass block; the mass block and the displacement sensors respectively comprise a plurality of metal layers and a dielectric layer between two metal layers. In the mass block, regions corresponding to the Y, Z and X direction displacement sensors respectively comprise at least two metal layers connected by a via. The Y, Z and X groups displacement sensors respectively comprise at least two metal layers connected by a via.

22 Claims, 4 Drawing Sheets

(56) References Cited

U.S. PATENT DOCUMENTS

| | | | |
|---|---|---|---|
| 2008/0314147 A1* | 12/2008 | Nasiri | G01P 15/125 73/514.32 |
| 2009/0322183 A1* | 12/2009 | Kawakubo | G01C 19/5621 310/329 |
| 2010/0043552 A1* | 2/2010 | Stenbock Andersen | G01P 15/0922 73/514.29 |
| 2010/0064804 A1* | 3/2010 | Kawakubo | G01C 19/56 73/504.03 |
| 2010/0077858 A1* | 4/2010 | Kawakubo | G01P 15/0802 73/504.12 |
| 2010/0242606 A1* | 9/2010 | Kanemoto | G01P 15/0802 73/514.38 |
| 2010/0244160 A1* | 9/2010 | Kanemoto | G01P 15/0802 257/415 |
| 2010/0288047 A1* | 11/2010 | Takagi | B81C 1/00246 73/514.32 |
| 2011/0101008 A1 | 5/2011 | Draganic, III | |
| 2011/0162453 A1* | 7/2011 | Wang | G01P 15/125 73/514.32 |
| 2013/0139595 A1* | 6/2013 | Tsai | G01P 15/125 73/514.32 |
| 2013/0270657 A1* | 10/2013 | Acar | G01C 19/5755 257/415 |
| 2013/0327147 A1* | 12/2013 | Feyh | G01P 15/0802 73/514.32 |

\* cited by examiner

THREE-AXIS ACCELEROMETER

FIELD OF THE INVENTION

The present invention relates to a three-axis accelerometer, in particular to a three-axis accelerometer that includes one single mass block and is capable of measuring displacement in three axes.

BACKGROUND OF THE INVENTION

The micro accelerometer is an element widely applied to, for example, smart phones, wearable devices and Internet of Things (IOT) devices. The micro accelerometer may also be applied to other fields of engineering, science, and industry. For providing a function of displacement measurement on a modern application, the micro accelerometer has to be highly integrated, have low power consumption, and provide correct measurement in displacement.

Since most of the known micro accelerometers are manufactured by an MEMS or CMOS process with a very small size, they can only provide single direction magnetism measurement. In other words, some micro accelerometers use a single mass block to provide measurement of displacement in one direction (the Y direction) in the plane of the mass block and a direction (the Z direction) perpendicular to the plane. If measurement of displacement in all three directions is necessary, an additional detector that detects displacement of another mass block in a third direction (the X direction) will be needed. Some other designs use a single mass block to provide measurement of displacement in all three directions. The accelerometer so designed, however, is bulky and complicated, difficult to fabricate.

U.S. Pat. No. 7,757,555 B2 disclosed a three-axis accelerometer that includes one single mass block and two groups of detection electrodes, arranged at two perpendicular axes in the plane of the mass block. The two groups of detection electrodes do not only provide measure of displacement of the mass block in the two axial directions (X/Y) but also displacement in the vertical axis (Z direction). The accelerometer so disclosed is complicated in structure and difficult to fabricate.

CN 101133332B disclosed a three-axis two accelerometer that includes micro accelerometers, wherein one accelerometer measures the X direction and Z direction displacement of the mass block and the other measures the Y direction and Z direction displacement of the mass block. This micro accelerometer is bulky and its mass block and electrodes are complicated in structure and difficult to fabricate.

US 2011/0101008 A1 disclosed a three-axis micro accelerometer that includes one single mass block and two groups of moveable electrodes that detect displacement of the mass block in two perpendicular directions. The mass block and detection electrodes of this design are complicated in structure and difficult to fabricate. In addition, the micro accelerometer is bulky.

U.S. Pat. No. 8,413,511 B2 disclosed a three-axis micro accelerometer with two mass blocks. One mass block is accommodated within another mass block and the two mass blocks respectively provide measurement of displacement in the X/Y and the Z directions. Again, the accelerometer is bulky and its mass block is complicated in structure and difficult to fabricate.

WO 2012172528A1 disclosed a three-axis polymer micro accelerometer that includes a sealed chamber consisted of injected elements that heat the air enclosed in the chamber. When an external force is applied, a temperature gradient is generated. A detector detects the temperature and the results are used to calculate accelerations in three axes.

U.S. Pat. No. 8,459,114 B2 discloses a multiple axes micro accelerometer that includes two mass blocks. One mass block performs seesaw movement to provide measurement of displacement in the Z direction, while the other is suspended by springs to provide measurement of displacement in the X/Y directions. The accelerometer is bulky and its mass blocks are complicated in structure and difficult to fabricate.

At present, a novel structure of micro three-axis micro accelerometer is needed in the industry to provide detection of displacement in three axes.

Meanwhile, a novel micro three-axis micro accelerometer is also needed to provide detection of displacement in three axes using one single mass block.

Meanwhile, it is also necessary to provide a micro accelerometer capable of integrating a three-axis displacement measurement function in a single mass block by taking the advantages of the standard CMOS process.

It is also necessary to provide a three-axis micro accelerometer that is simple in structure and easy to fabricate.

SUMMARY OF THE INVENTION

The present invention provides a micro accelerometer capable of measuring displacement in all three axes using a single mass block.

The present invention also provides a micro accelerometers integrating a three-axis displacement measurement function in a single mass block taking the advantages of the standard CMOS process.

Another objective of this invention is to provide a three-axis micro accelerometer that is simple in structure and easy to fabricate.

A micro accelerometer according to the present invention comprises a substrate, a suspending mass block suspended in the substrate, a group of Y direction displacement detection electrodes, a group of Z direction displacement detection electrodes, and a group of X direction displacement detection electrodes. The Y, Z and X direction displacement detection electrodes are arranged in the substrate, adjacent to the mass block. The X and Y directions respectively represent two orthogonal directions of a plane where the mass block is arranged and the Z direction represents a direction perpendicular to the plane. The mass block, the Y, Z and X direction displacement detection electrodes respectively include at least two metal layers and a dielectric layer between any two metal layers. In the mass block, regions corresponding to each of the Y, Z and X direction displacement detection electrodes respectively include at least two metal layers connected by a via. The Y, Z and X direction displacement detection electrodes respectively include at least two metal layers connected by a via. The Y and Z direction displacement detection electrodes are provided in a first portion in a structure formed by the mass block and the electrodes, while the X direction displacement detection electrodes are provided in a second portion in the structure. The via may be filled up by metal material. In the mass block, the portion corresponding to the Y direction displacement detection electrodes and the portion corresponding to the Z direction displacement detection electrodes may be in different planes or in a same plane. If they are in the same plane, the two portions are electrically insulated from each other.

The micro accelerometer may also comprise a detection circuit for calculating displacement of the mass block in three directions of X, Y and Z, according to an output of the Y direction displacement detection electrodes, the Z direction displacement detection electrodes and/or the X direction displacement detection electrodes.

In several preferred examples of the present invention, the mass block, the Y, Z and X direction displacement detection electrodes are formed integrally in a structure comprising a plurality of metal layers and a plurality of dielectric layers staggered sequentially. The mass block is separated, at an interval of space, from the Y, Z and X direction displacement detection electrodes, at a distance sufficient to maintain a detectable capacity. In this example, the Y, Z and X direction displacement detection electrodes respectively form, at one side adjacent to the mass block, finger extensions extending in the X/Y plane and the mass block also forms, at a side adjacent to the respectively Y, Z and X direction displacement detection electrodes, finger extensions which extend in the X/Y plane and into recesses formed by the finger extensions of the respectively Y, Z and X direction displacement detection electrodes.

In some preferred embodiments of this invention, the Y and Z direction displacement detection electrodes are stacked along the Z direction in the first portion of the structure of the micro accelerometer, while the X direction displacement detection electrodes are provided in the second portion of the structure, without being stacked with the first portion. In the above-mentioned embodiment, the Y direction displacement detection electrodes are located in first and second metal layers of the structure. In this example, a first sub-group of electrodes of the Y direction detection electrodes may comprise a plurality of finger electrodes and a second sub-group of electrodes also comprises a plurality of finger electrodes, with finger electrodes of the two sub-groups being arranged in a staggered configuration, such that a finger electrode pair including a finger electrode of the first sub-group of electrodes and a finger electrode of the second sub-group of electrodes corresponds to one of finger extensions of the mass block. In a preferred example, the micro accelerometers comprises two group of Y direction displacement detection electrodes, each group comprising two sub-groups of electrodes, both located in the first and second metal layers of the structure. Preferably, the first and second metal layers of each group of electrodes of the Y direction displacement detection electrodes are connected by a via.

In the above-mentioned example, the Z direction displacement detection electrodes are respectively located in a third and a fourth metal layers and in a fifth and a sixth metal layers of the structure; with the third and fourth metal layers and the fifth and sixth metal layers being located at different heights in the Z direction. In a preferred example, the micro accelerometers comprises two groups of Z direction displacement detection electrodes, each group comprising two sub-groups of electrodes respectively located in the third and fourth metal layers and in the fifth and sixth metal layers of the structure; the third and fourth metal layers are located above the fifth and sixth metal layers. That is, the first sub-group of electrodes of the first group of Z direction displacement detection electrodes and the first sub-group of electrodes of the second group of Z direction displacement detection electrodes are located in a same plane, and the second sub-group of electrodes of the first group of Z direction displacement detection electrodes and the second sub-group of electrodes of the second group of Z direction displacement detection electrodes are located in a same plane. The first and second metal layers and the third to sixth metal layers maintain a predetermined distance therebetween with at least one dielectric layer.

In the above-mentioned example, preferably, the third and fourth metal layers of the Z direction displacement detection electrodes are connected by a via and the fifth and sixth metal layers are also connected by a via. The via may be filled with metal material. Moreover, the first and second metal layers of the mass block may also be connected by a via and the third and fourth metal layers are connected by a via. The via may be filled with metal material. The two groups of Y direction displacement detection electrodes may be located at two sides of the mass block in the X direction and the two groups of Z direction displacement detection electrodes are also located at two sides of the mass block in the X direction.

The X direction displacement detection electrodes may be arranged in a portion of the structure formed by the mass block and the detection electrodes identical to the first portion where the Y and Z direction displacement detection electrodes are arranged, whereby the X direction displacement detection electrodes are stacked with the Y and Z direction displacement detection electrodes. However, in the preferred embodiments of this invention, the X direction displacement detection electrodes are arranged in a second portion of the structure, which is side-by-side to the first portion. Such arrangement is not any technical limitation but rather is an adaptation to the layer structure and mental-layer limitations under the standard CMOS process or similar preparation processes.

The X direction displacement detection electrodes are respectively located in a seventh and an eighth metal layers of the structure; with one or two of the seventh and eighth metal layers being located at same heights with one or two of the first to sixth metal layers, or at different metal layers, in the Z direction. In the former case, the X direction displacement detection electrodes use two of the first to sixth metal layers, while maintaining a predetermined distance separated from the Y and X direction displacement detection electrodes. In the later case, the X direction displacement detection electrodes are stacked with the first to sixth metal layers, while maintaining a predetermined distance separated from the Y and X direction displacement detection electrodes by at least one dielectric layer. In such embodies, two metal layers in the mass block at a region corresponding to the X direction displacement detection electrodes may be connected by a via. The via may be filled with metal material.

In one preferred embodiment, the micro accelerometer include two groups of X direction displacement detection electrodes, respectively located at two sides to the mass block in the X direction. Preferably, the seventh and eighth metal layers of each of the X direction displacement detection electrodes are connected by a via.

The Y, Z and X direction displacement detection electrodes respectively provide contacts to be connected with an external detection circuit that detects a change in capacitance between the detection electrodes and their respectively corresponding portion of the mass block, to determine a Y direction, Z direction and X direction displacement amount of the mass block, respectively.

DETAILED DESCRIPTION OF THE INVENTION

The present invention will be described below according to its preferred examples, it should make appreciated that preferred examples of the present invention are only given to illustrate preferred embodiments of the present invention. The scope of the present invention is not limited to the examples disclosed in the description.

Figure 1:
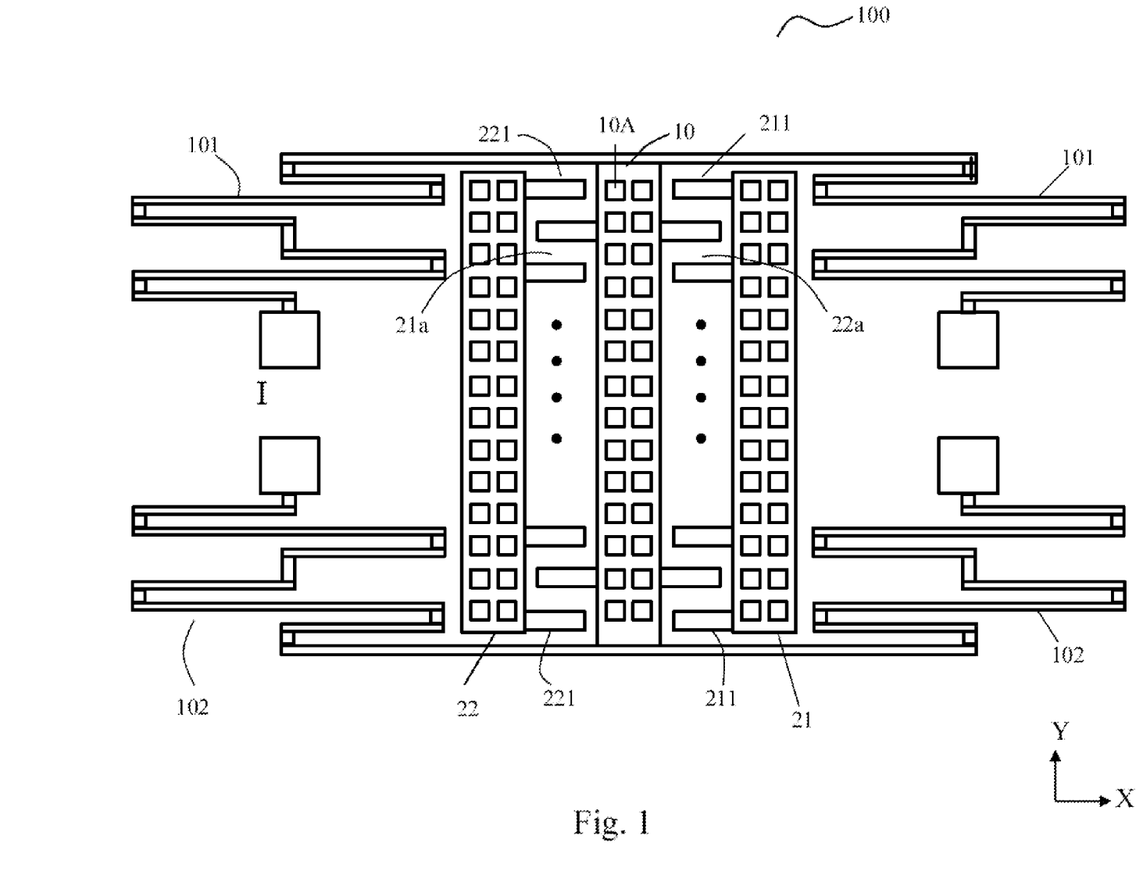
FIG. 1 shows the plan view of a three-axis micro accelerometer structure fabricated according to the present invention.

FIG. 1 shows the plan view of a three-axis micro accelerometer structure fabricated according to the present invention. As shown in this figure, the three-axis micro accelerometer structure 100 comprises a mass block 10 and two groups of finger electrode structures 21, 22 at two sides of the mass block 10. The mass block 10 and two groups of finger electrode structures 21, 22 shown in the figure are structures manufactured by a standard CMOS process. The mass block 10 and the two groups of finger electrode structures 21, 22 are electrically insulated at intervals by a space 21A, 22A, respectively. If the structural body is manufactured by a standard CMOS process, the two groups of finger electrode structures 21, 22 may include 6 metal layers and a dielectric layer between two metal layers and on the top and below the bottom layers, all arranged on a substrate (not shown). A plurality of finger electrodes 211, 221 extends in the X direction in the figure from the plane where the two groups of finger electrode structures 21, 22 are arranged. In the following description, when the extension direction of the finger electrode plates 211, 221 is X direction, the direction in the same plane and perpendicular to the X direction is Y direction, as illustrated by the coordinates in the figure. The direction perpendicular to the plane is referred to as Z direction.

The mass block 10 is located in a structure defined by the two groups of finger electrode structures 21, 22. In the example shown in the figure, the mass block 10 has a rectangular body, with a length direction parallel to the Y direction. If the structural body is manufactured by the standard CMOS process, the mass block 10 may comprise metal layers in a number less than the metal layers of the two groups of finger electrode structures 21, 22, e.g., 6 layers, and a dielectric layer between any two of the metal layers and on the top and below the bottom layers, and suspends on the substrate. The space between the mass block 10 and the substrate and the space 21A, 22A between the mass block 10 and the two groups of finger electrode structures 21, 22 are formed by a standard CMOS process, e.g., formed by etching. For forming this space, etch windows 10A and 10A might have to be fabricated in the mass block 10 to facilitate processing. However, the etch windows 10A and 10A are not any technical limitations. For maintaining suspension of the mass block 10, the mass block 10 is fixed to the structural body 100 by springs 101, 102. A plurality of finger extensions extends from two sides of the mass block 10 in the X direction and into a space formed by any two finger extensions of the finger electrode plates 211, 221 of the finger electrode structures 21, 22 and maintains a certain distance from the finger electrode plates 211, 221.

The structure 100 provides contacts, and necessary wires, at the Y, Z and X direction displacement detection electrodes, to output detection signals of the respective direction displacement detection electrodes to an external detection circuit, for the calculation of displacement of the mass block in the respective Z, Y and Z directions. The structure 100 shown in FIG. 1 may be fabricated in a standard CMOS process or any process that produces a microelectromechanical structure. The basic structure of a structure 100 that includes finger electrodes is a known art. Details of the process that produces such a structure are thus omitted.

Figure 2:
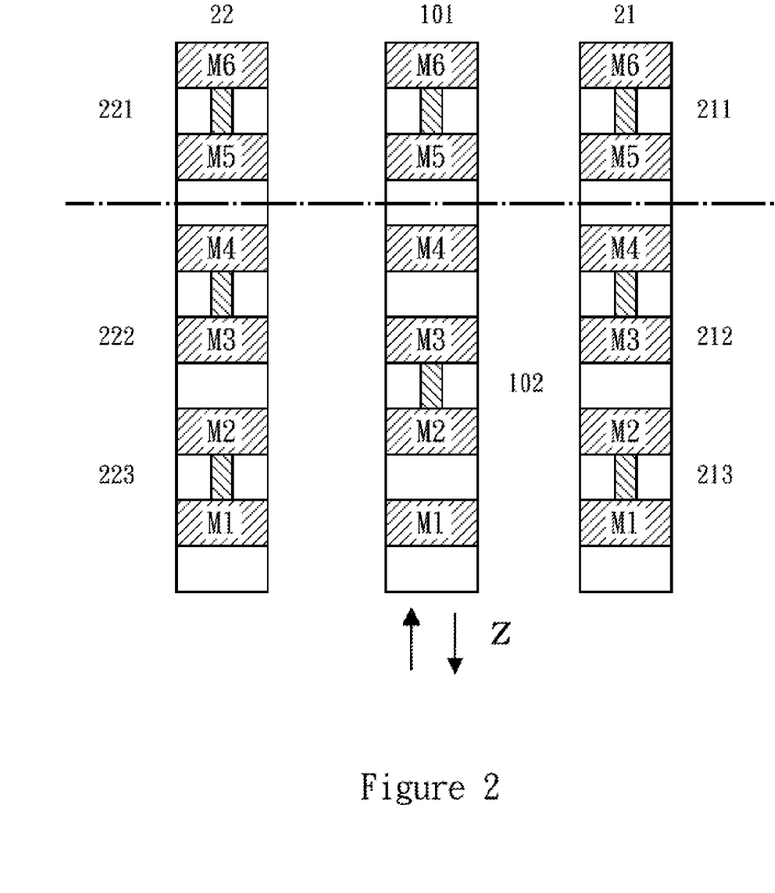
FIG. 2 shows the schematic diagram of Y and Z direction displacement detection electrodes according to an embodiment of the present invention.

For providing effective measurement for the movement amounts of the mass block 10 in the X, Y and Z directions, a preferred example of the present invention forms electrodes required in the measurement of mass block displacement amount by means of connecting two adjacent metal layers by a via. That is, the common electrodes in the mass block 10 and the Y, Z and X direction displacement measurement electrodes in the finger electrode structures 21, 22 all include two adjacent metal layers connected by a via. FIG. 2 shows the schematic diagram of a Y and Z direction detection electrode structure according to an embodiment of the present invention. In the embodiment as shown in the figure, the finger electrode structures 21, 22 are located to two sides of the mass block 10. The first and second metal layers (M5, M6) of the mass block 10 are connected by a via to form an electrical connection. The fourth and fifth metal layers (M2, M3) of the mass block 10 are also connected by a via to form an electrical connection. Meanwhile, the first and second metal layers (M5, M6) of the finger electrode structures 21, 22 are connected by a via to form an electrical connection. The third and fourth metal layers (M3, M4) and the fifth and sixth metal layers (M1, M2) of the finger electrode structures 21, 22 are also respectively connected by a via to form respective electrical connections. If necessary, each via can be filled with metal.

Figure 3:
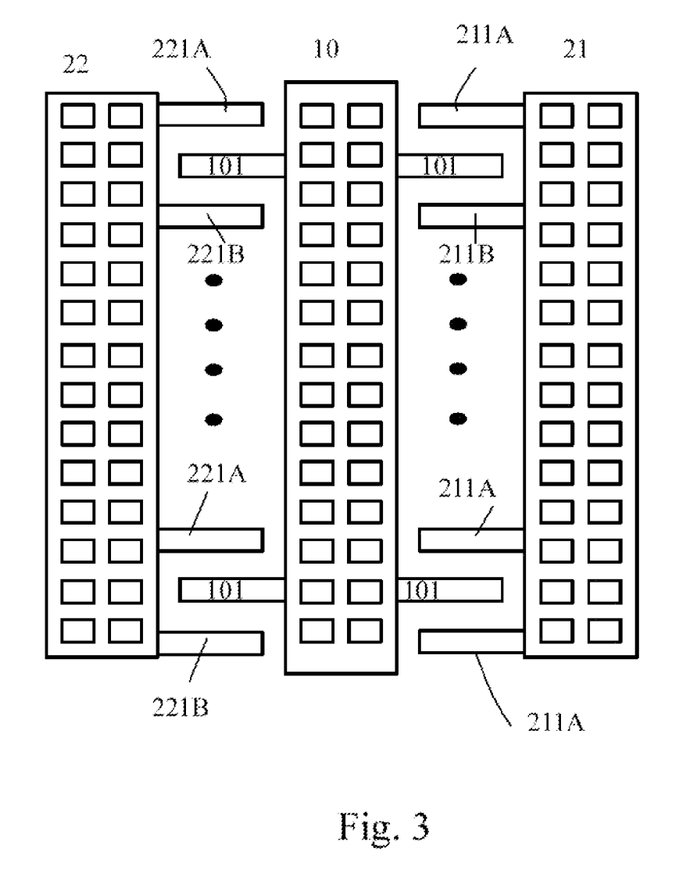
FIG. 3 shows the plan view of an electrode structure according to the embodiment of FIG. 2 and illustrates a structure of Y direction displacement detection electrodes 211A, 211B, 221A and 221B.

In the above-mentioned architecture, the M5/M6 metal layers of the finger electrode structures 21, 22 in the figure form Y direction displacement detection electrodes 211A, 211B, 221A, 221B of the finger electrode structures 21, 22. The electrodes 211, 221 are fixed to the finger electrode structures 21, 22 and are stationary. FIG. 3 shows the plan view of an electrode structure according to an embodiment of the present invention and illustrates a structure of the Y direction displacement detection electrodes 211A, 211B, 221A and 221B. As shown in the figure, electrodes 211A, 211A form the first sub-group of electrodes of the first set of Y direction detection electrodes and electrodes 211B, 211B form the second sub-group of electrodes of the first set of the Y direction detection electrode. Electrodes 221A, 221A form the first sub-group of electrodes of the second set of the Y direction detection electrode and electrodes (221B, 221B) form the second sub-group of electrodes of the second set of the Y direction detection electrode. Electrodes of the same sub-group are electrically connected and are electrically insulated from electrodes of other sub-groups. Lines (L1, L2, L3, L4) in the figure show electrical connections among the components, which are not necessarily their physical connections. The electrodes of each sub-group may form a connection or insulation by means of conductive lines formed in different metal layers. For example, electrodes 211A, 211A of the first sub-group of the first set of the Y direction detection electrodes may use the first metal layer M6 as their conductive lines and electrodes 211B, 211B of the second sub-group may use the second metal layer M5 as their conductive lines. And so on. The electrodes of each sub-group are further connected to a detection circuit (not shown) by conductive lines in the same manner.

As shown in FIG. 2, the M5/M6 metal layers of the mass block 10 form a common electrode 101. When the mass block moves relatively to the detection electrodes, the component of this movement in the Y direction (direction of arrow Y in FIG. 3, i.e., Y direction in FIG. 1) will change respective distances between the common electrode 101 and the first sub-group of electrodes 211A, 221A and between the common electrode 101 and the second sub-group of electrodes 211B, 221B, both of the Y direction displacement detection electrodes, so as to change the respective capacitances between the common electrode 101 and the sub-groups of electrodes of the Y direction displacement detection electrodes accordingly. The amount of change is detected by the Y direction displacement detection electrodes 211A, 211B, 221A, 221B and then transferred to a next stage detection circuit to convert same into a voltage signal, for example, and the Y direction displacement amount is calculated on this basis.

By the same way, the M3/M4 and M1/M2 metal layers of the finger electrode structures 21, 22 in FIG. 2 respectively form Z direction displacement detection electrodes 212, 213 and 222, 223 of the finger electrode structures 21, 22. The electrodes 212, 213 and 222, 223 are fixed to the finger electrode structures 21, 22 and are stationary. The M2/M3 metal layers of the mass block 10 form a common electrode 102. When the mass block 10 moves in respective to the detection electrodes, the component of this movement in the Z direction (the direction of arrow Z direction in FIG. 2) will change the respective distances between the common electrode 102 and the Z direction displacement detection electrodes 212, 213 and 222, 223, so as to change capacitances between the common electrode 102 and the Z direction displacement detection electrodes 212, 222 and between the common electrode 102 and the Z direction displacement detection electrodes 213, 223 accordingly. The amount of change is detected by the Z direction displacement detection electrodes 212, 213 and 222, 223 and then transferred to the next stage detection circuit to convert same into a voltage signal, for example, and the Z direction displacement amount is calculated on this basis.

In this embodiment, the Y direction displacement detection electrodes include two groups, i.e., a first group of electrodes 211A, 211B and a second group of electrodes 221A, 221B respectively located at two sides of the mass block 10 in the X direction. The Z direction displacement detection electrodes also include two groups, i.e., a first group of electrodes 212, 213 and a second group of electrodes 222, 223, also located at two sides of the mass block 10 in the X direction. However, a person skilled in the art would appreciate that generally it only needs to include one group of these detection electrodes. Moreover, it is practical to use more than two groups.

Figure 4:
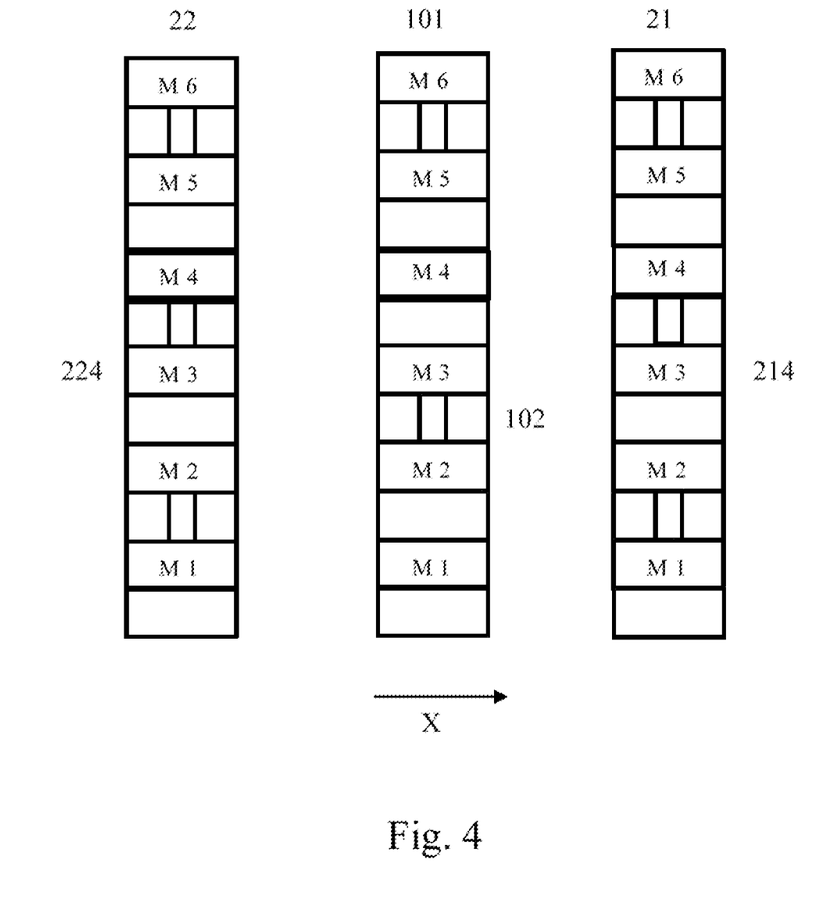
FIG. 4 shows the schematic diagram of X direction displacement detection electrodes according to an embodiment of the present invention.

FIG. 4 shows the schematic diagram of X direction displacement detection electrodes according to an embodiment of the present invention. The X direction displacement detection electrodes 214, 224 may be formed as finger electrodes and arranged at a region other than the region where the Y and Z direction displacement detection electrodes locate. For example, in the structure shown in FIG. 1, it is possible to have the finger electrodes at the upper part of the figure to function as the Y and Z direction displacement detection electrodes and the finger electrodes at the lower part of the figure to function as the X direction displacement detection electrodes. However, it is also possible to stack the X direction displacement detection electrodes with the Y and Z direction displacement detection electrodes, as long as the structure 100 provides sufficient number of metal layers. The example shown in FIG. 4 is suited in the current standard CMOS process, since such process provides only 6 metal layers.

As shown in this figure, all metal layers of the mass block 10 are connected by a via and all metal layers of the respectively X direction displacement detection electrodes are also connected by a via. For those having ordinary skills in the art it is appreciated that such via connections enhance detection signals of the X direction displacement detection electrodes 214, 224 but are not technically necessary. In general, the X direction displacement detection electrodes 214, 224 needs only two metal layers. Therefore, if the process of the three-axis micro accelerometer provides more than 6 metal layers, a stack structure would suffice all the detection electrodes of the three-axis micro accelerometer.

The metal layers of the finger structure 21, 22 shown in FIG. 4 respectively form the X direction displacement detection electrodes 214, 224, which are stationary in the finger structure 21, 22. A common electrode 102 is formed in the metal layers of the mass block 10. When the mass block 10 moves in respective to the detection electrodes, the component of this movement in the X direction (the direction of arrow X direction in FIG. 4) will change the respective distances between the common electrode 102 and the X direction displacement detection electrodes 214, 224, so as to change capacitances between the common electrode 102 and the X direction displacement detection electrodes 214, 224 accordingly. The amount of change is detected by the X direction displacement detection electrodes 214, 224 and then transferred to the next stage detection circuit to convert same into a voltage signal, for example, and the X direction displacement amount is calculated on this basis.

Although the above-mentioned structures use specific metal layers as the detection electrodes and common electrodes, a person skilled in the art would appreciate that in a standard CMOS structure, any combination of metal layers may be used as the detection electrodes and common electrodes of the present invention, which is not limited by the manners as shown in the embodiments. Moreover, the three-axis micro accelerometer structure of the present invention also is not limited to that manufactured by the standard CMOS process; any manufacturing method forming a stacked structure of metal layers and dielectric material layers can be used to manufacture the three-axis micro accelerometer of the present invention.

There is no special limitation to the material of the metal layer. Any material with good electric conductivity and suitable for processing can be used in the present invention. Suitable material includes: copper, silver, gold, aluminium and alloys thereof. There is also no special limitation to the material of the via and its filling material. Any material with good electric conductivity and suitable for processing can be applied in the present invention. Suitable material includes: copper, silver, gold, aluminium and alloys thereof. The material of the metal layer may be the same as or different from the material of the via and its filling material. The dielectric layers preferably use high dielectric material, e.g., silicon or metal oxides and their oxynitrides. There also is no special limitation in the thickness of each metal layer and dielectric layer. However, if the three-axis micro accelerometer is manufactured by a standard CMOS process, the thickness of each metal layer and dielectric layer is preferably equal to that of the standard process specification, so as to simplify the process.

The mass block 10 is preferably suspended in the structural body by springs 101, 102. The springs 101, 102 may generally comprise several metal layers and dielectric layers between the metal layers. The material of the metal layers and dielectric layers of the springs 101, 102 is preferably the same as the material of the mass block 10 and the finger electrode structures 21, 22. However, this is also not any technical limitation. The techniques for manufacturing suspending mass blocks and finger electrode structures are well known, which will not be further described here.

The technique of the detection circuit in calculating a displacement according to the displacement amount of the mass block 10 is well known. Detailed description thereof is thus omitted. The present invention, however, has provided a novel structure for the three-axis micro accelerometer, capable of detecting displacement in all three axes.

The three-axis micro accelerometer structure may be manufactured individually and then combined with the detection circuit. However, it may also be manufactured in a same structural body together with circuit architectures such as the detection circuit and other mechanical architectures, so as to simplify the interfaces therebetween.

What is claimed is:

1. A three-axis micro accelerometer, comprising a substrate, a suspending mass block suspended in the substrate, a group of Y direction displacement detection electrodes, a group of Z direction displacement detection electrodes and a group of X direction displacement detection electrodes; the Y, Z and X direction displacement detection electrodes being arranged on the substrate adjacent to the mass block; the Y and X directions being perpendicular in a plane of the mass block and the Z direction being perpendicular to the plane; wherein:

the mass block and the Y, Z and X direction displacement detection electrodes respectively comprise a plurality of metal layers and a dielectric layer between two metal layers;

in the mass block, portions corresponding to the Y, Z and X direction displacement detection electrodes respectively comprise at least two metal layers connected by a via;

each of the Y, Z and X direction displacement detection electrodes comprises two sub-groups of electrodes, each comprising at least two metal layers connected by a via; and the Y direction displacement detection electrodes and the Z direction displacement detection electrodes are provided in a first portion of a structure formed by the mass block and the detection electrodes and the X direction displacement detection electrodes is provided in a second portion of the structure other than the first portion.

2. The three-axis micro accelerometer as claimed in claim 1, wherein the via is filled with a metal material.

3. The three-axis micro accelerometer as claimed in claim 1, wherein in the mass block, the portion corresponding to the Y direction displacement detection electrodes and the portion corresponding to the Z direction displacement detection electrodes are in different planes.

4. The three-axis micro accelerometer as claimed in claim 1, wherein in the mass block, the portion corresponding to the Y direction displacement detection electrodes and the portion corresponding to the Z direction displacement detection electrodes are in the same plane and are electrically insulated from each other.

5. The three-axis micro accelerometer as claimed in claim 1, further comprising a detection circuit for calculating displacement of the mass blocking three directions of X, Y and Z, according to an output of the Y direction displacement detection electrodes, the Z direction displacement detection electrodes and/or the X direction displacement detection electrodes.

6. The three-axis micro accelerometer as claimed in claim 1, wherein the mass block, the Y direction displacement detection electrodes, the Z direction displacement detection electrodes and the X direction displacement detection electrodes are formed integrally in a structure which is formed by a plurality of metal layers and a plurality of dielectric layers staggered sequentially and the mass block is separated, at an interval of space, from the Y, Z and X direction displacement detection electrodes at a predetermined distance sufficient to generate detectable capacitance.

7. The three-axis micro accelerometer as claimed in claim 6, wherein the Y direction displacement detection electrodes, the Z direction displacement detection electrodes and the X direction displacement detection electrodes all form, at one side adjacent to the mass block, finger extensions extending in the X/Y plane; and the mass block forms, at a side adjacent to the respective Y, Z and X direction displacement detection electrodes, finger extensions which extend in the X/Y plane and into recesses formed by the finger extensions of the respective Y, Z and X direction displacement detection electrodes.

8. The three-axis micro accelerometer as claimed in claim 7, wherein the Y direction displacement detection electrodes are located in first and second metal layers of the structure; a first sub-group of electrodes of the Y direction detection electrodes includes a plurality of finger electrodes, and a second sub-group of electrodes thereof also comprises a plurality of finger electrodes, with finger electrodes of the two sub-groups being arranged in a staggered configuration, such that a finger electrode pair including a finger electrode of the first sub-group of electrodes and a finger electrode of the second sub-group of electrodes corresponds to one of finger extensions of the mass block.

9. The three-axis micro accelerometer as claimed in claim 7, wherein the three-axis micro accelerometer comprises two groups of Y direction displacement detection electrodes, each group of Y direction displacement detection electrodes comprising two sub-groups of electrodes, both located in a first and a second metal layers of the structure.

10. The three-axis micro accelerometer as claimed in claim 9, wherein the first and second metal layers of each sub-group of electrodes of the Y direction displacement detection electrodes are connected by a via.

11. The three-axis micro accelerometer as claimed in claim 7, wherein the Y direction displacement detection electrodes are located in first and second metal layers of the structure and the Z direction displacement detection electrodes are respectively located in the third and fourth metal layers and in the fifth and sixth metal layers of the structure; and the third and fourth metal layers and the fifth and sixth metal layers are located at different heights in the Z direction.

12. The three-axis micro accelerometer as claimed in claim 11, wherein the three-axis micro accelerometer comprises two groups of Z direction displacement detection electrodes, each group of Z direction displacement detection electrodes comprising two sub-groups of electrodes respectively located in the third and fourth metal layers and in the fifth and sixth metal layers of the structure; wherein the third and fourth metal layers are located above the fifth and sixth metal layers.

13. The three-axis micro accelerometer as claimed in claim 12, wherein the first and second metal layers and the third to sixth metal layers maintain a predetermined distance therebetween with at least one dielectric layer.

14. The three-axis micro accelerometer as claimed in claim 12, wherein the third and fourth metal layers of the Z direction displacement detection electrodes are connected by a via and the fifth and sixth metal layers thereof are also connected by a via.

15. The three-axis micro accelerometer as claimed in claim 14, wherein the first and second metal layers of the mass block are connected by a via and the fourth and fifth metal layers of the mass block are connected by a via.

16. The three-axis micro accelerometer as claimed in claim 1, wherein the three-axis micro accelerometer comprises two groups of X direction displacement detection electrodes, each group of X direction displacement detection electrodes being respectively located to two sides of the mass block in the X direction.

17. The three-axis micro accelerometer as claimed in claim 16, wherein the Y, Z and X direction displacement detection electrodes are respectively located to two sides of the mass block in the X direction.

18. The three-axis micro accelerometer as claimed in claim 16, wherein each group of the X direction displacement detection electrodes comprises a seventh and eighth metal layers of the structure connected by via.

19. The three-axis micro accelerometer as claimed in claim 1, wherein the Y, Z and X direction displacement detection electrodes are stacked in the structure.

20. The three-axis micro accelerometer as claimed in claim 1, wherein the Y and Z direction displacement detection electrodes are stacked in a first portion of the structure along the Z direction and the X direction displacement detection electrodes is provided in a second portion of the structure that is not stacked with the first portion.

21. The three-axis micro accelerometer as claimed in claim 1, wherein one or two metal layers of the X direction displacement detection electrodes are located at the same height with one or two metal layers of the Y direction displacement detection electrodes or the Z direction displacement detection electrodes in the X direction.

22. The three-axis micro accelerometer as claimed in claim 1, wherein the Y, Z and X direction displacement detection electrodes respectively provide contacts to be connected by an external detection circuit.

* * * * *